Sept. 27, 1932.   U. A. WHITAKER   1,879,648
GRADUATED RELEASE VALVE
Filed Oct. 12, 1929
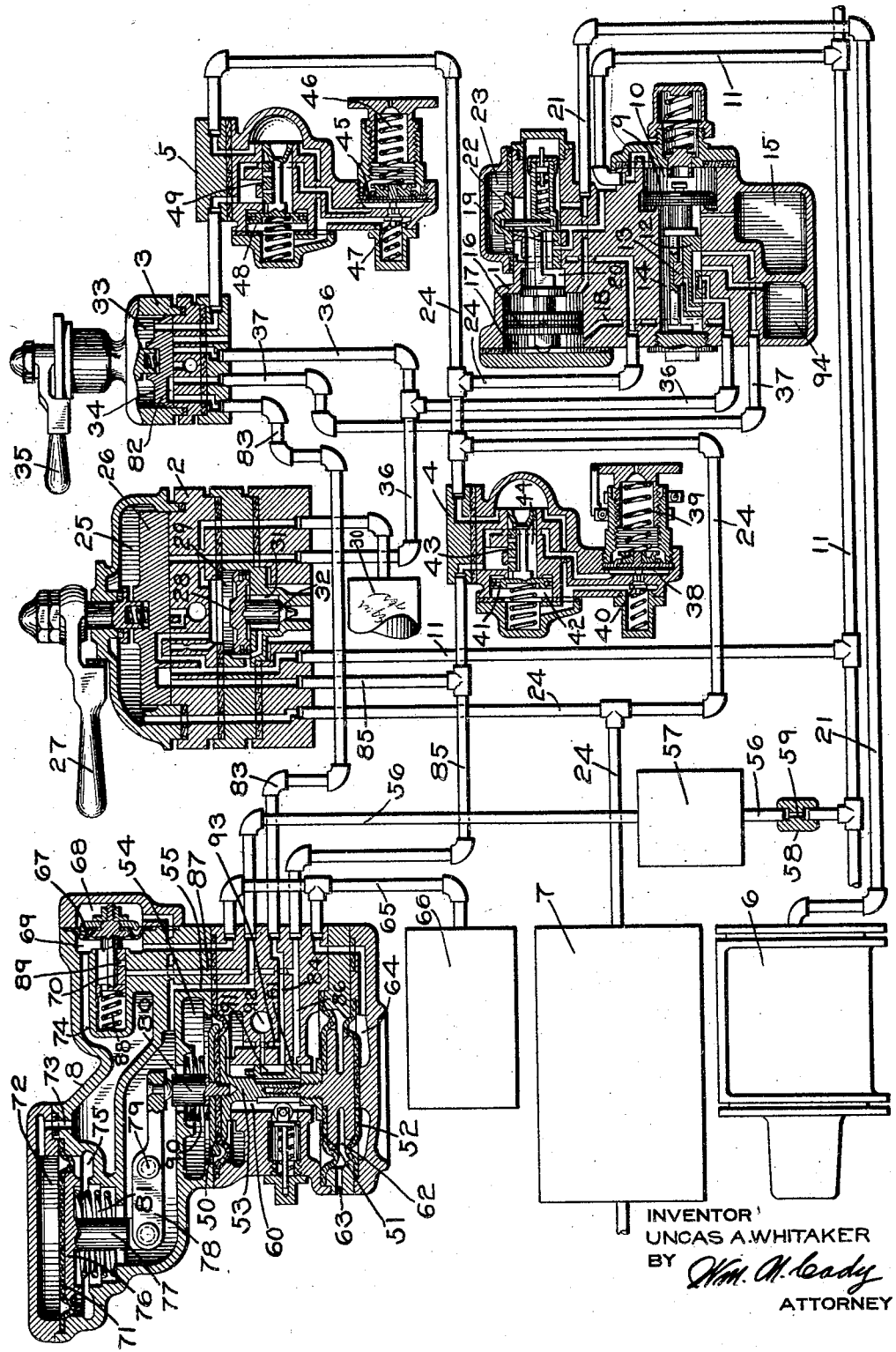
INVENTOR
UNCAS A. WHITAKER
BY *Wm. A. Cady*
ATTORNEY Patented Sept. 27, 1932

1,879,648

UNITED STATES PATENT OFFICE

UNCAS A. WHITAKER, OF CANTON, OHIO, ASSIGNOR TO THE WESTINGHOUSE AIR BRAKE COMPANY, OF WILMERDING, PENNSYLVANIA, A CORPORATION OF PENNSYLVANIA

GRADUATED RELEASE VALVE

Application filed October 12, 1929. Serial No. 399,154.

This invention relates to fluid pressure brakes, and more particularly to a locomotive brake equipment.

The fluid pressure brake equipment employed on railway cars is provided with means for graduating the release of the brakes and with this equipment, it has been found that after a full service application of the brakes, the brakes may be graduated off until the brake pipe pressure has been increased to within approximately ten pounds of the normal standard pressure carried in the brake pipe, at which point the brakes will completely and fully release.

On the locomotive, however, the brakes are released independently, and may be completely released before, or continue to release after, the train brakes are fully released.

The principal object of my invention is to provide a locomotive brake equipment having means for effecting the release of the locomotive brakes in synchronism with the train brakes.

In the accompanying drawing, the single figure is a diagrammatic view, with the principal parts in section, of a locomotive brake equipment, embodying my invention.

The locomotive brake equipment may be of the well known E. T. locomotive brake type comprising a distributing valve device 1, an automatic brake valve device 2, an independent brake valve device 3, a feed valve device 4, a reducing valve device 5, a brake cylinder 6 representing the several brake cylinders on the locomotive, and a main reservoir 7. In addition to the above equipment, a release controlling valve device 8 is provided, in accordance with my invention.

The distributing valve device 1 may be of the usual construction comprising an equalizing portion and an application and release portion. The equalizing portion comprises a piston 9 contained in piston chamber 10, which is connected to the brake pipe 11 and a main slide valve 12 and a graduating slide valve 13, contained in valve chamber 14, which is connected to a pressure chamber 15, the valves 12 and 13 being operated by piston 9.

The application and release portion comprises a piston 16 contained in application cylinder 17, which is connected to a passage 18, leading to the seat of slide valve 12, a release slide valve 19, contained in valve chamber 20, which is connected to pipe 21, leading to the brake cylinder 6, and an application supply valve 22, contained in valve chamber 23, which is connected to a main reservoir supply pipe 24, said valves being operated by piston 16.

The automatic brake valve device 2 comprises a casing having a valve chamber 25, connected to the main reservoir supply pipe 24 and containing a rotary slide valve 26, adapted to be operated by a handle 27.

The brake valve device also includes the usual equalizing discharge valve device, comprising an equalizing piston 28, having the chamber 29 at one side connected to an equalizing reservoir 30 and the chamber 31 at the opposite side connected to the usual brake pipe 11. Piston 28 is adapted to operate a discharge valve 32 for venting fluid under pressure from the brake pipe to the atmosphere.

The independent brake valve device 3 comprises a casing having a valve chamber 33, containing a rotary slide valve 34, adapted to be operated by a handle 35. An application cylinder pipe 36 leads from passage 18 in the distributing valve device 1 and has branches leading to the seats of the rotary valves 26 and 34. A distributing valve release pipe 37 leads to the seat of slide valve 12 and to the seat of the independent rotary valve 34.

The feed valve device 4 comprises a regulating portion and a supply portion. The regulating portion comprises a diaphragm 38 subject on one side to brake pipe pressure, when the automatic brake valve is in running position and on the opposite side to the pressure of a regulating spring 39.

The diaphragm 38 is adapted to operate a valve 40 for controlling the operation of the supply portion. The supply portion comprises a piston 41 contained in piston chamber 42, the pressure in which is controlled by the valve 40, and a slide valve 43, contained in valve chamber 44 and adapted to be operated by piston 41.

The reducing valve device 5 is similar in construction to the feed valve device 4, and comprises a diaphragm 45, a regulating spring 46, a regulating valve 47, a supply piston 48, and a supply slide valve 49.

The release controlling valve device 8 comprises casing sections in which are mounted flexible diaphragms 50, 51, and 52. The diaphrams are rigidly connected together through a stem 53 and chamber 54 at the outer face of diaphragm 50 is connected to a passage 55 which in turn is connected through a pipe 56 with the brake pipe 11. Interposed in pipe 56 is a volume reservoir 57 and a choke plug 58 having a restricted flow port 59.

The valve chamber 60, intermediate the diaphragms 50 and 51, contains a slide valve 61 adapted to be operated by the movement of the diaphragm stem 53. The chamber 62 intermediate the diaphragms 51 and 52 is open to the atmosphere through passage 63 and chamber 64 at the outer face of diaphragm 52 is connected, through a pipe 65 with a control reservoir 66.

For charging the control reservoir 66, a charging valve device is provided comprising a flexible diaphragm 67, having chamber 68 at one side connected to passage 55 and chamber 69 at the opposite side connected to the control reservoir pipe 65. The chamber 69 contains a slide valve 70 adapted to be operated by diaphragm 67.

The valve device 8 also includes a flexible diaphragm 71, having the chamber 72 at one side connected through a passage 73 and a passage 74 with valve chamber 69. The chamber 75 at the opposite side of the diaphragm is connected to passage 55 and the brake pipe. The diaphragm 71 engages a follower plate 76 having a stem 77 to which one end of a lever 78 is pivotally connected. The lever 78 is pivotally mounted on a pin 79 and the other end of the lever is adapted to engage a stem 80 carried by the diaphragm 50. The diaphragm 71 is subject to the pressure of a coil spring 81 which opposes the pressure acting on the diaphragm in chamber 72.

When the independent brake valve 3 is in running position, the distributing valve release pipe 37 is connected through cavity 82 in the rotary valve 34 with a pipe 83, which instead of leading to the seat of the automatic brake valve 2, as in the present equipment, is connected to a passage 84 which leads to the seat of the slide valve 61 of the release controlling valve device 8.

Pipe 85, through which fluid under pressure is supplied by the feed valve device 4 to the brake valve device 2, is connected to a passage 86, leading to the seat of slide valve 61.

The apparatus being charged with fluid under pressure in the usual manner, which is well known and need not be explained, fluid under pressure is also supplied from the feed valve device 4 to the release control valve device 8 and flows through passage 87 to the seat of slide valve 70.

Fluid under pressure in the brake pipe 11 flows through pipe 56 to chamber 68 and shifts the diaphragm 67 against the pressure of spring 88, so that passage 87 is connected through port 89 in slide valve 70 with valve chamber 69. Fluid at feed valve pressure is then supplied through passage 87 to valve chamber 69 and flows thence through pipe 65, charging the control reservoir to the pressure supplied by the feed valve device and corresponding with the standard normal pressure carried in the brake pipe.

When the pressure in valve chamber 69 and reservoir 66 has been increased to substantially the brake pipe pressure in chamber 68, the spring 88 shifts the diaphragm 67 and slide valve 70 to the position shown in the drawing.

The fluid pressure in chamber 64 is that of the control reservoir 66 and the fluid pressure in chamber 54 is brake pipe pressure and these pressures being equal when the brake pipe is fully charged and the areas of diaphragms 50 and 51 being equal, the pressures are balanced except for the spring 90, which then forces the diaphragms downwardly to release position, as shown on the drawing. In this position, pipe 83 and passage 84 are connected, through cavity 91 in slide valve 61 with an atmospheric exhaust port 92, so that the distributing valve release pipe 37, which is connected to pipe 83, in the running position of the independent brake valve is connected to the atmosphere and consequently, any build up of pressure in the distributing valve release pipe by leakage of fluid under pressure past the equalizing slide valve 12 of the distributing valve device 1, is prevented.

In effecting a service application of the brakes, the distributing valve release pipe 37 is blanked by the movement of the equalizing slide valve 12. As the pressure in the brake pipe falls, the pressure in chamber 54 decreases and the fluid pressure in chamber 64 remaining constant, the diaphragms 50, 51, and 52 will be moved upwardly, against the pressure of spring 90. This movement causes the operation of valve 61 so as to cut off communication between passage 84 and exhaust port 92 and also so that passage 86 is opened to valve chamber 60.

The fluid pressure in said valve chamber is then built up by flow from the feed valve device 4. The area of the diaphragm 51 is somewhat greater than the area of the diaphram 50, so that when the pressure in valve chamber 60, acting on the differential area of diaphragm 51 corresponds with the loss in pressure in chamber 54, due to the reduction in brake pipe pressure, the diaphragms will be moved downwardly, so as to cause the valve 61 to close the passage 86.

The object of building up the pressure in chamber 60 is to prevent any sudden drop in pressure in the application chamber of the distributing valve device, when the equalizing piston 9 moves to release position and connects the application chamber with the distributing valve release pipe, it being noted that valve chamber 60 is connected to the passage 84 and pipe 83, through a passage 93.

In effecting a graduated release of the brakes, when the brake pipe pressure is increased, the triple valve devices on the cars of the train operate in a well known manner to release fluid from the brake cylinder to correspond with the amount of increase in brake pipe pressure. On the locomotive, according to my invention, when a gradual increase in brake pipe pressure is made, the equalizing piston 9 moves to release position in which the application cylinder 17 and the application chamber 94 are connected to the distributing valve release pipe 37 in the usual manner. The increase in brake pipe pressure is communicated to the chamber 54 of the release control valve device and the fluid pressure being increased in said chamber, the diaphragm 50 is subjected to the increased pressure and the diaphragms 50, 51, and 52 are then moved downwardly, shifting the slide valve 61, so that the passage 84, the pipe 83, and consequently the distributing valve release pipe 37 are connected to the exhaust port 92.

Fluid under pressure is thus released from the application cylinder 17 and the application chamber 94 by way of the distributing valve release pipe, and the piston 16 of the distributing valve device is shifted so as to operate the release valve 19 to release fluid under pressure from the brake cylinder 6.

When the slide valve 61 is in release position, the valve chamber 60 is connected through passage 93 and cavity 91 with exhaust port 92 and the fluid pressure in said valve chamber is then reduced. Upon the pressure in valve chamber 60 being reduced to a degree, such that the constant pressure in chamber 64 over balances the opposing pressures on the diaphragms, the diaphragms 50, 51, and 52 are moved upwardly, so that the slide valve 93 is shifted to cut off the further venting of fluid from the distributing valve release pipe.

When the brake cylinder pressure acting in valve chamber 20 of the distributing valve device has been reduced to a degree slightly less than the pressure of fluid retained in the application cylinder 17 by the closing of the exhaust from the distributing valve release pipe, the piston 16 is moved to the right, operating the release valve 19, so as to cut off the further venting of fluid from the brake cylinder 6.

The brake pipe pressure may be further increased to effect a further release of fluid from the brake cylinders on the cars of the train and the release control valve device on the locomotive operates upon the further increase in brake pipe pressure to effect the further venting of fluid from the distributing valve release pipe 37 and from the application cylinder 17. The application piston 16 is then operated in the same manner as hereinbefore described, to effect the further release of fluid from the brake cylinder 6.

When the brake pipe pressure has been increased in the above manner to within a predetermined degree of the normal pressure carried in the brake pipe, for example, ten pounds, the fluid pressure in the brake pipe acting in chamber 75 plus the pressure of spring 81 overcomes the control reservoir pressure acting in chamber 72, and the diaphragm 71 is moved upwardly, so as to operate the lever 78 and thereby apply pressure through the stem 80 to the diaphragm 50 and the diaphragms 50, 51, and 52 are then shifted to release position and are maintained in that position, so that the fluid under pressure remaining in the application cylinder 17, the application chamber 94, and in the distributing valve release pipe 37 is vented to the atmosphere, through cavity 91 and exhaust port 92.

This permits the piston 16 to remain in release position, so that the fluid under pressure remaining in the brake cylinder 6 is released by operation of the release valve 19.

It will thus be seen that when the brake valve 2 is operated to effect a graduated release of the brakes on the cars of the train, by causing gradual increases in the brake pipe pressure, the release control valve device 8 on the locomotive automatically operates to simultaneously effect a corresponding gradual release of the brakes on the locomotive.

The volume reservoir 57 and the restricted flow passage 59 in the pipe 56 are employed for the purpose of preventing any transitory surges of pressure in the brake pipe from effecting the operation of the release control valve device.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, a pipe through which fluid under pressure is released to effect the release of the brakes on the locomotive, a control reservoir charged with fluid under pressure, and a valve device subject to the opposing pressures of the brake pipe and said control reservoir and operated upon an increase in brake pipe pressure for releasing fluid from said release pipe.

2. In a fluid pressure brake, the combination with a brake pipe, a pipe through which fluid under pressure is released to effect the release of the brakes on the locomotive, a control reservoir, a valve device subject to the opposing pressures of the brake pipe and said control reservoir and operated upon an increase in brake pipe pressure for releasing fluid from said release pipe, and a feed valve device for supplying fluid under pressure to said control reservoir.

3. In a fluid pressure brake, the combination with a brake pipe and a release pipe through which fluid under pressure is released in effecting the release of the brakes on the locomotive, of a valve device on the locomotive for controlling the release of fluid from said release pipe comprising a plurality of flexible diaphragms subject to the opposing pressure of the brake pipe and a constant pressure and also subject to the pressure of fluid in said release pipe, and a valve operated by said diaphragms for controlling the release of fluid from said release pipe.

4. In a fluid pressure brake, the combination with a brake pipe and a release pipe through which fluid under pressure is released in effecting the release of the brakes on the locomotive, of a plurality of movable abutments subject to the opposing pressures of the brake pipe and a constant pressure, a valve operated by said abutments for controlling the release of fluid from said release pipe, a spring, and an additional movable abutment subject to the pressures of the brake pipe and said spring for also controlling the operation of said valve.

5. In a fluid pressure brake, the combination with a brake pipe and a release pipe through which fluid under pressure is released in effecting the release of the brakes on the locomotive, of a plurality of movable abutments subject to the opposing pressures of the brake pipe and a constant pressure, a valve operated by said abutments for controlling the release of fluid from said release pipe, a spring, an additional movable abutment subject to the pressures of the brake pipe and said spring, and a lever operatively connecting said additional abutment to said plurality of abutments.

6. In a fluid pressure brake, the combination with a brake pipe and a release pipe through which fluid under pressure is released in effecting the release of the brakes on the locomotive, of a plurality of movable abutments subject to the opposing pressures of the brake pipe and a constant pressure, a valve operated by said abutments for controlling the release of fluid from said release pipe, a spring, an additional movable abutment subject on one side to brake pipe pressure and the pressure of said spring and on the opposite side to a constant pressure for also controlling the operation of said valve.

7. In a fluid pressure brake, the combination with a brake pipe, a brake cylinder, an application and release valve device operated by an increase in pressure in an application chamber for supplying fluid to the brake cylinder, and upon a decrease in pressure in said chamber for releasing fluid from said brake cylinder, and an equalizing valve device operated upon a reduction in brake pipe pressure for supplying fluid to said chamber and upon an increase in brake pipe pressure for releasing fluid from said chamber through a release pipe, of an auxiliary valve device for controlling the release of fluid through said release pipe and operated upon an increase in brake pipe pressure for releasing fluid through said release pipe.

8. In a fluid pressure brake, the combination with a brake pipe, a brake cylinder, an application and release valve device operated by an increase in pressure in an application chamber for supplying fluid to the brake cylinder, and upon a decrease in pressure in said chamber for releasing fluid from said brake cylinder, and an equalizing valve device operated upon a reduction in brake pipe pressure for supplying fluid to said chamber and upon an increase in brake pipe pressure for releasing fluid from said chamber through a release pipe, of an auxiliary valve device on the locomotive subject to the opposing pressure of the brake pipe and a constant pressure and operated upon an increase in brake pipe pressure for also controlling the release of the brakes on the locomotive.

9. In a fluid pressure brake, the combination with a brake pipe, a brake cylinder, an application and release valve device operated by an increase in pressure in an application chamber for supplying fluid to the brake cylinder, and upon a decrease in pressure in said chamber for releasing fluid from said brake cylinder, and an equalizing valve device operated upon a reduction in brake pipe pressure for supplying fluid to said chamber and upon an increase in brake pipe pressure for releasing fluid from said chamber through a release pipe, of an auxiliary valve device on the locomotive subject to the opposing pressures of the brake pipe and a constant pressure and operated upon an increase in brake pipe pressure for releasing fluid from said release pipe.

10. In a fluid pressure brake, the combination with a brake pipe, a brake cylinder, an application and release valve device operated by an increase in pressure in an application chamber for supplying fluid to the brake cylinder, and upon a decrease in pressure in said chamber for releasing fluid from said brake cylinder, and an equalizing valve device operated upon a reduction in brake pipe pressure for supplying fluid to said chamber and upon an increase in brake pipe pressure for releasing fluid from said chamber through a release pipe, of an auxiliary valve device on the locomotive operated upon a gradual increase in brake pipe pressure for effecting the gradual release of fluid under pressure from said release pipe.

In testimony whereof I have hereunto set my hand, this 9th day of October, 1929.

UNCAS A. WHITAKER.